United States Patent
Dykan et al.

(10) Patent No.: US 11,036,349 B2
(45) Date of Patent: *Jun. 15, 2021

(54) STATEFUL, CONTEXTUAL, AND DRAGGABLE EMBEDDED WIDGET

(71) Applicant: salesforce.com, inc., San Francisco, CA (US)

(72) Inventors: Orlee Dykan, San Francisco, CA (US); Robert Birbeck, Hillsboro, OR (US); Joshua Boyden, Portland, OR (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,969

(22) Filed: Apr. 22, 2020

(65) Prior Publication Data

US 2020/0249800 A1  Aug. 6, 2020

Related U.S. Application Data

(63) Continuation of application No. 16/137,356, filed on Sep. 20, 2018, now Pat. No. 10,671,236.

(51) Int. Cl.
| | |
|---|---|
| *G06F 3/0486* | (2013.01) |
| *G06F 3/0481* | (2013.01) |
| *G06F 3/0484* | (2013.01) |
| *H04L 29/08* | (2006.01) |
| *G06F 3/0483* | (2013.01) |
| *H04L 29/06* | (2006.01) |

(52) U.S. Cl.
CPC .......... *G06F 3/0481* (2013.01); *G06F 3/0486* (2013.01); *G06F 3/04845* (2013.01); *G06F 3/0483* (2013.01); *H04L 67/02* (2013.01); *H04L 67/42* (2013.01)

(58) Field of Classification Search
CPC .................................................... G06F 3/0486
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

OTHER PUBLICATIONS

U.S. Office Action dated Oct. 18, 2019 issued in U.S. Appl. No. 16/137,356.

(Continued)

*Primary Examiner* — Daniel Rodriguez
(74) *Attorney, Agent, or Firm* — Weaver Austin Villeneuve & Sampson LLP

(57) ABSTRACT

Disclosed are some implementations of systems, apparatus, methods, and computer program products for implementing, a stateful, contextual, and draggable widget. A widget application stores a state of the widget, a context of the widget, and coordinates of the widget. When a user navigates from one web page of a web site to another web page of the web site, the widget application reconstitutes the widget using the saved state, context, and coordinates of the widget.

21 Claims, 13 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 6,963,901 B1 * | 11/2005 | Bates ............... H04L 67/02 709/206 |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,349 B1 * | 10/2009 | Kraft ............... G06Q 10/10 |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,196,112 B1 * | 6/2012 | Cansizlar ......... G06F 16/9577 717/126 |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,606,652 B2 * | 12/2013 | Gonsalves ......... G06Q 30/0643 705/26.7 |
| 8,646,103 B2 | 2/2014 | Jakobson et al. |
| 9,569,097 B2 * | 2/2017 | Ramachandran ..... G06F 40/106 |
| 9,720,554 B2 * | 8/2017 | Frohwein ............. G06Q 10/10 |
| 10,025,702 B1 * | 7/2018 | Karppanen ......... G06F 12/0868 |
| 10,671,236 B2 | 6/2020 | Dykan et al. |
| 10,691,750 B1 * | 6/2020 | Karppanen ........... G06F 3/0481 |
| 10,798,029 B2 * | 10/2020 | Kushwaha ............ H04L 51/046 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |

(56) References Cited

U.S. PATENT DOCUMENTS

| | | |
|---|---|---|
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0015818 A1* | 1/2006 | Chaudhri ............ G06F 3/0482 715/779 |
| 2006/0074884 A1* | 4/2006 | Sawashima .......... G06F 16/951 |
| 2007/0118813 A1* | 5/2007 | Forstall ............... G06F 3/0482 715/805 |
| 2008/0120325 A1* | 5/2008 | Davis ................. G06F 16/4387 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0287824 A1* | 11/2009 | Fisher .................. G06F 9/542 709/226 |
| 2010/0010987 A1* | 1/2010 | Smyth ................ G06F 16/9535 707/E17.014 |
| 2010/0017855 A1* | 1/2010 | Johnson ............. G06F 16/9574 726/4 |
| 2010/0095067 A1* | 4/2010 | Kosaraju ............ G06F 16/9574 711/126 |
| 2010/0115438 A1* | 5/2010 | Chu ......................... G06F 8/38 715/764 |
| 2010/0175011 A1* | 7/2010 | Song ...................... G06F 9/543 715/769 |
| 2010/0197219 A1* | 8/2010 | Issa ....................... H04H 20/61 455/3.06 |
| 2010/0257196 A1* | 10/2010 | Waters ................. G06F 16/248 707/769 |
| 2010/0318601 A1* | 12/2010 | Park ....................... G06F 9/451 709/203 |
| 2010/0318890 A1* | 12/2010 | Billharz ............... G06F 16/958 715/212 |
| 2011/0022955 A1* | 1/2011 | Gilfix ....................... G06F 8/36 715/702 |
| 2011/0088028 A1* | 4/2011 | Tofighbakhsh ... H04M 1/72406 717/178 |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0233143 A1* | 9/2012 | Everingham ....... G06F 16/9032 707/706 |
| 2012/0290407 A1 | 11/2012 | Hubbard et al. |
| 2012/0303452 A1* | 11/2012 | Xue ....................... H04L 51/02 705/14.49 |
| 2012/0331406 A1* | 12/2012 | Baird .................... G06F 16/95 715/760 |
| 2013/0080953 A1* | 3/2013 | Rodriguez ............ G06F 3/0481 715/767 |
| 2013/0111330 A1* | 5/2013 | Staikos .................. G06F 40/10 715/241 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0226736 A1* | 8/2013 | Hogg .................... G06Q 30/06 705/26.61 |
| 2013/0247216 A1 | 9/2013 | Cinarkaya et al. |
| 2014/0143231 A1* | 5/2014 | Adari .................... G06F 16/957 707/722 |
| 2014/0258837 A1* | 9/2014 | Horton .................. G06F 3/0486 715/234 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0058318 A1* | 2/2015 | Blackwell ............. G06F 16/248 707/722 |
| 2015/0095162 A1 | 4/2015 | Jakobson et al. |
| 2015/0095820 A1* | 4/2015 | Fellman ............. G06F 3/04847 715/765 |
| 2015/0142596 A1 | 5/2015 | Jakobson et al. |
| 2015/0172563 A1 | 6/2015 | Jakobson et al. |
| 2016/0092576 A1* | 3/2016 | Quercia ............. G06Q 30/0631 707/734 |
| 2016/0313880 A1* | 10/2016 | Godewyn ............... H04L 67/22 |
| 2017/0017672 A1* | 1/2017 | Fan ...................... G06F 16/9574 |
| 2017/0097752 A1* | 4/2017 | Horton .................. G06F 40/143 |
| 2017/0139548 A1* | 5/2017 | De Las Heras ....... G06F 40/134 |
| 2017/0193117 A1* | 7/2017 | Reigen .................... H04L 67/02 |
| 2018/0285328 A1* | 10/2018 | Pivato ................. H04L 67/1095 |
| 2018/0293031 A1* | 10/2018 | Yano .................. H04N 1/00411 |
| 2020/0133982 A1* | 4/2020 | Thangeswaran ........ H04L 67/02 |

OTHER PUBLICATIONS

U.S. Notice of Allowance dated Jan. 23, 2020 issued in U.S. Appl. No. 16/137,356.

"Google Plus Users", Google+Ripples, Oct. 31, 2011 [retrieved on Feb. 21, 2012 from Internet at http://www.googleplusers.com/google-ripples.html], 3 pages.

* cited by examiner

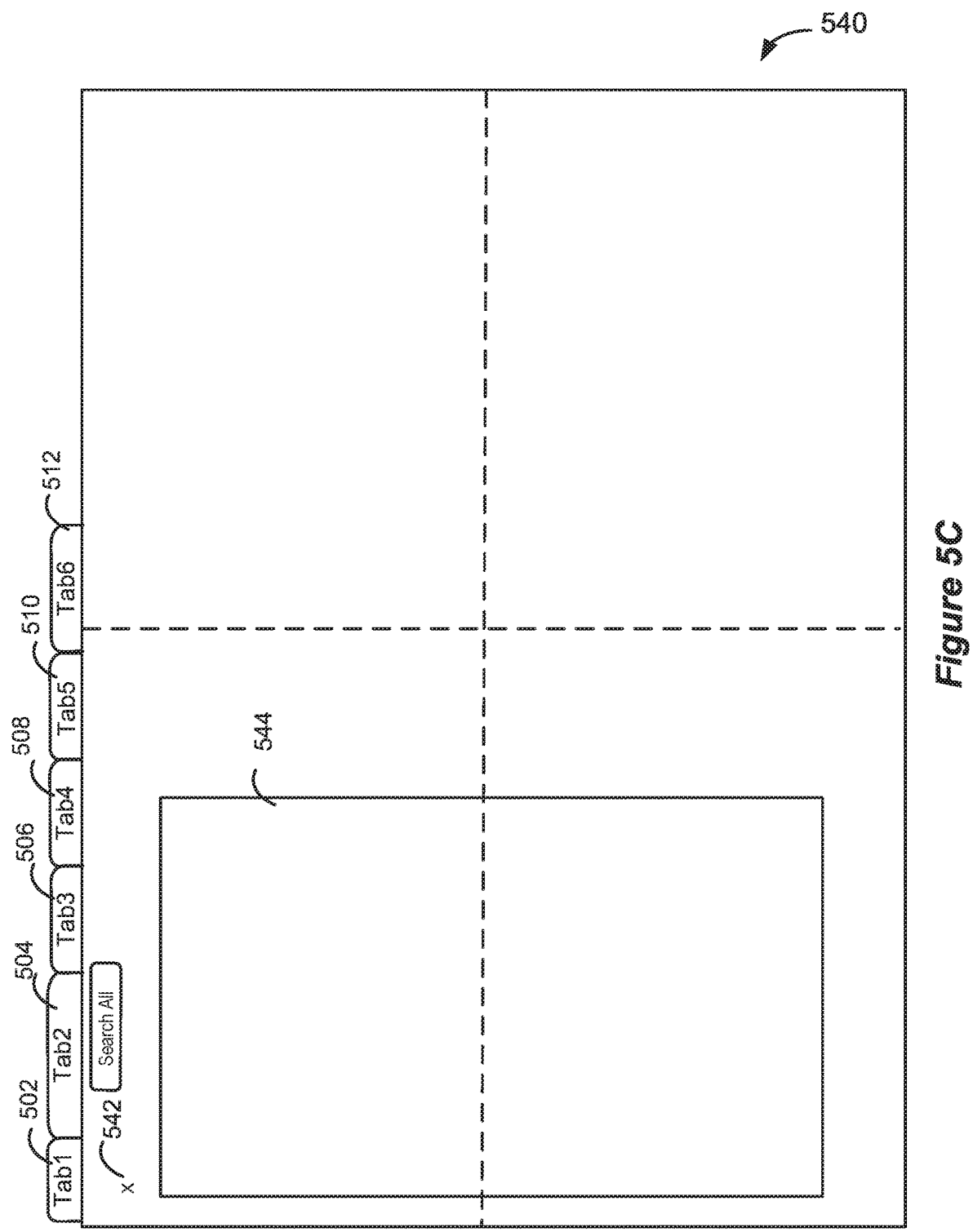

STATEFUL, CONTEXTUAL, AND DRAGGABLE EMBEDDED WIDGET

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with widgets. More specifically, this patent document discloses techniques for implementing a widget that is stateful, contextual, and draggable.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, email systems, and instant messaging systems, by way of example, in a cloud computing environment.

When a user interacts with a "cloud computing" service, the user may access a number of different web sites. Often, a web page of a web site will include a widget. A widget is an application that typically performs a specific function and provides an element of a graphical user interface (GUI) at a specific location within the web page. The widget generally provides a specific way for the user to interact with the widget.

BRIEF DESCRIPTION OF THE DRAWINGS

The included drawings are for illustrative purposes and serve only to provide examples of possible structures and process operations for the disclosed inventive systems, apparatus, and methods for implementing widgets. These drawings in no way limit any changes in form and detail that may be made by one skilled in the art without departing from the spirit and scope of the disclosed embodiments.

FIG. 4A shows an example of a graphical user interface (GUI) 400 generated on a display device of a client device in an on-demand database service environment, in accordance with some implementations.

FIG. 4B shows an example of a GUI 450 generated on a display device of a client device in an on-demand database service environment, in accordance with some implementations

FIG. 5C shows an example of a GUI 540 generated on a display device of a client device in an on-demand database service environment after the widget GUI of FIG. 5B is dragged to another location, in accordance with some implementations.

DETAILED DESCRIPTION

Figure 1:
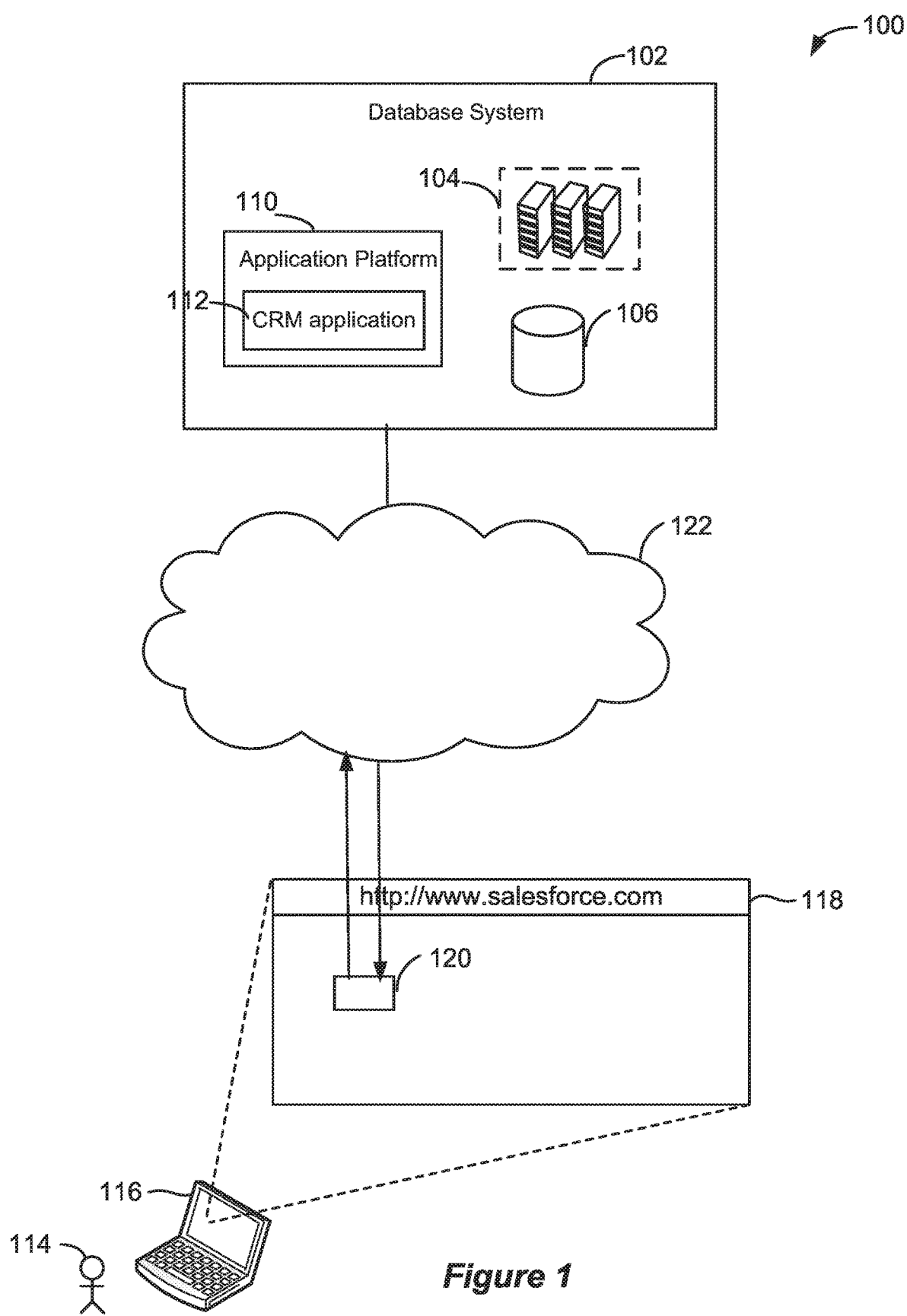
FIG. 1 shows a system diagram of an example of a system 100 in which a widget may be implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Various implementations described or referenced herein are directed to different methods, apparatus, systems, and computer program products for facilitating the implementation of a widget in an on-demand service environment. In some implementations, the disclosed methods, apparatus, systems, and computer program products may be configured or designed for use in a multi-tenant database environment.

A widget generally includes two components: an application (i.e., computer program) and an element of a graphical user interface (GUI). In the following description, the term "widget application" will be used to refer to the application and the term "widget GUI" will be used to refer to the corresponding element of the GUI.

The disclosed implementations generally relate to a widget application. The widget application may be embedded in a web page that is subsequently downloaded on the client device. The widget application may then obtain and render information that is pertinent to the user's context via a widget GUI. The disclosed methods, apparatus, and systems are further configured to render interfaces or parts of interfaces in web browser processes running on client machines.

In some implementations, a widget application, when executed, provides a widget GUI that is contextual. More particularly, the widget application may save contextual information pertaining to a web page to which the user has navigated in a memory of the client device. For example, the contextual information can include a record identifier (ID) associated with a current or recent web page to which the user has navigated. The record ID may identify a database record stored within a database of a remote database system. The contextual information may then be used to obtain pertinent data from a server. The widget application may provide the data via the widget GUI and/or save the data in a state of the widget GUI for subsequent retrieval. In some implementations, the contextual information may be saved in browser memory.

In some implementations, the widget application, when executed, provides a widget GUI that is stateful. More particularly, the widget application may save a state of the widget GUI in memory of the client device. The state may be saved such that it includes or is associated with the context. For example, the state of the widget GUI can include user input received via the widget GUI and/or data received via the widget GUI from a server, which may be in response to user input received via the widget GUI. When the user navigates to another web page within the same web site, returns to the web page at a later time (e.g., during a browser session), or opens the widget GUI while on the same web page, the previously saved state of the widget GUI may be retrieved from memory for use in reconstructing the widget GUI within a browser window. In some implementations, the state of the widget GUI may be saved in browser memory.

In addition, in some implementations, the widget GUI is draggable by a user. After the user drags the widget GUI to a particular location within a browser window, coordinates of the widget GUI within the browser window may be saved in memory of the client device. In some implementations, the widget application saves coordinates of the widget GUI in local storage of the web browser. Upon navigating to another web page or returning to the web page at a later time, the widget application may retrieve the coordinates of the widget GUI from memory (e.g., local storage of the web browser) and use the coordinates to render the widget GUI within the browser window. In this manner, the previous widget GUI may be reconstructed at the same user-selected location within the browser window.

In some implementations, the widget application performs automatic resizing and/or positioning of the widget GUI based upon a user-selected position for the widget GUI within the browser window. More particularly, the widget application may automatically resize and/or reposition the widget GUI so that it is rendered within the largest amount of available space within the browser window. In some implementations, the widget application a direction in which to expand the widget GUI based, at least in part, on a location (e.g., coordinates) of the widget GUI in relation to the browser window. For example, the widget application may consider the quadrant of the browser window in which the widget GUI is located.

In some implementations, the widget application provides a widget GUI that is contextual, stateful, and draggable for a particular browser session. As a user navigates to different web pages of a web site during the browser session, the widget GUI may be reconstructed based upon the saved contextual information, state, and coordinates. When a user logs out, shuts down their computer, or refreshes the current web page of the web site, the browser session ends and the contextual information state, and/or coordinates may be deleted from memory. In some implementations, the state and contextual information are deleted from the memory (e.g., browser memory) when a browser session ends while the coordinates remain in the memory (e.g., local storage).

By way of illustration, John is a sales employee within a Sales group at an organization, Salesforce, Inc. John accesses a console application via his computing device. The console application presents a user interface that includes various tabs that facilitate access to information pertaining to leads, cases, and contacts. The user interface rendered within a browser window includes information received from a data provider (e.g., the organization). For example, the information can include tabs that can be selected by a user, as well as data that is rendered upon selection of one of the tabs. Tabs can correspond to various categories or sub-categories of data, e.g., leads, cases, and/or contacts. An icon representing a widget GUI is rendered at the bottom right corner of the user interface. John clicks on the icon and the widget GUI expands to cover the bottom right quadrant of the user interface. The expanded GUI element includes a search interface (e.g., input box) via which a user may submit a search query.

John clicks on the contacts tab to access the phone number of Jane, a contact for a lead, XYZ. Since the widget GUI covers the phone number of Jane, John decides to drag and drop the widget GUI to another location within the user interface. More particularly, John performs a drag-and-drop operation to drag and drop the widget GUI to the upper left corner of the user interface. The widget GUI expands to into the upper left quadrant of the user interface.

While John is on the call, John enters a query pertaining to Jane's question into the search interface and a list of search results is rendered within a segment of the widget GUI. John clicks on a link of one of the search results, identifies an answer to Jane's question, and responds to Jane's question while he is on the phone with her. John then clicks on the widget GUI to close the widget GUI.

After John's call with Jane, John clicks on the Contacts tab to access the phone number for another contact, ABC. The icon corresponding to the widget GUI is rendered at the previously selected location, the upper left corner of the user interface. John clicks on the icon to open the widget GUI, which expands to fill the upper left quadrant. The widget GUI contains the search results that were previously rendered within the widget GUI.

FIG. 1 shows a system diagram of an example of a system 100 in which a widget may be implemented, in accordance with some implementations. In FIG. 1, a tenant database system 102 associated with an organization includes any number of computing devices such as servers 104. The servers 104 are in communication with one or more storage mediums 106 configured to store and maintain relevant metadata used to perform some of the techniques disclosed herein, as well as to store and maintain relevant data and/or metadata generated by the techniques disclosed herein. In this example, storage mediums 106 include tenant data storage configured to store and maintain tenant data generated by or otherwise maintained by tenants of tenant database system 102. Tenant data can include, for example, database records corresponding to clients, contacts, orders, cases, etc. In addition, storage mediums 106 can include web pages and associated metadata such as corresponding Uniform Resource Locators (URLs).

Database system 102 also includes application platform 110. Application platform 110 of tenant database system 102 may be a framework that allows applications of the tenant database system 102 to run. For example, application platform 110 may include hardware and/or software, e.g., the operating system. In some implementations, application platform 110 supports the creation, managing and executing of one or more applications.

In this example, application platform 110 is configured to support the execution of an application such as a customer relationship management (CRM) application that enables client devices to access database records maintained in storage mediums 106. The CRM application is configured to respond to requests from client devices by providing web pages that can be downloaded by client devices. At least a portion of the web pages may contain an embedded widget application that includes computer-readable instructions configured to provide a widget GUI as described herein. In addition, the widget application, when downloaded to a client device, may be configured to communicate with servers 104, as will be described in further detail below. Servers 104 may be configured to communicate with the widget application. Servers 104 may also be configured to access data and/or metadata stored in storage mediums 106, external services offered by servers external to database system 102, and/or data maintained in storage mediums outside database system 102.

Storage mediums 106 may further store computer-readable instructions configured to perform some of the techniques described herein. In addition, the storage mediums 106 may store metadata, data, or other information received and/or generated by a tenant as described herein.

In some implementations, tenant database system 102 is also configured to store privilege information identifying or specifying access rights and restrictions of users according to various attributes such as a specified user ID, type of user, role of user, a community to which the user belongs, and/or a particular organization on behalf of which a community is maintained. Each of the communities may be operated on behalf of an organization. Each organization may have associated therewith one or more tenants, which may each be associated with one or more communities.

The servers 104 may be associated with a network domain, such as www.salesforce.com and may be controlled by a data provider associated with the network domain. A user of client computing device machine 116 can have an account at salesforce.com®. By logging into this account, the user can access the various services provided by servers 104.

In the following examples, it is assumed that a user 114 accessing CRM application 112 via a computing device 116 has access rights to data that is maintained in tenant storage. In addition, it is assumed that the user 114 has access rights to CRM application 112. For example, in the following description, it may be assumed that user 114 has successfully logged in to CRM application 112.

During execution of CRM application 112, a web page 118 containing an embedded widget application may be downloaded to client computing device 116. Upon downloading the web page 118, the widget application may execute in a web browser to generate a widget GUI, which may be rendered by the web browser within a browser window of computing device 116. More particularly, the widget application may render the widget GUI 120 within the web page 118. For example, the widget GUI 120 may be rendered in a closed state in the form of an icon. Upon opening the widget GUI 120, the widget GUI 120 may be expanded to include a search interface. Various operations that may be performed by the widget application will be described in further detail below.

The client device 116 may be in communication with the data provider via network 122. More particularly, the widget application and/or web browser may communicate with servers 104 via network 122. For example, network 122 can be the Internet. In another example, network 122 comprises one or more local area networks (LAN) in communication with one or more wide area networks (WAN) such as the Internet.

Embodiments described herein are often implemented in a cloud computing environment, in which the data network 110, servers 104a and 104b, and possible additional apparatus and systems such as multi-tenant databases may all be considered part of the "cloud."

Figure 2:
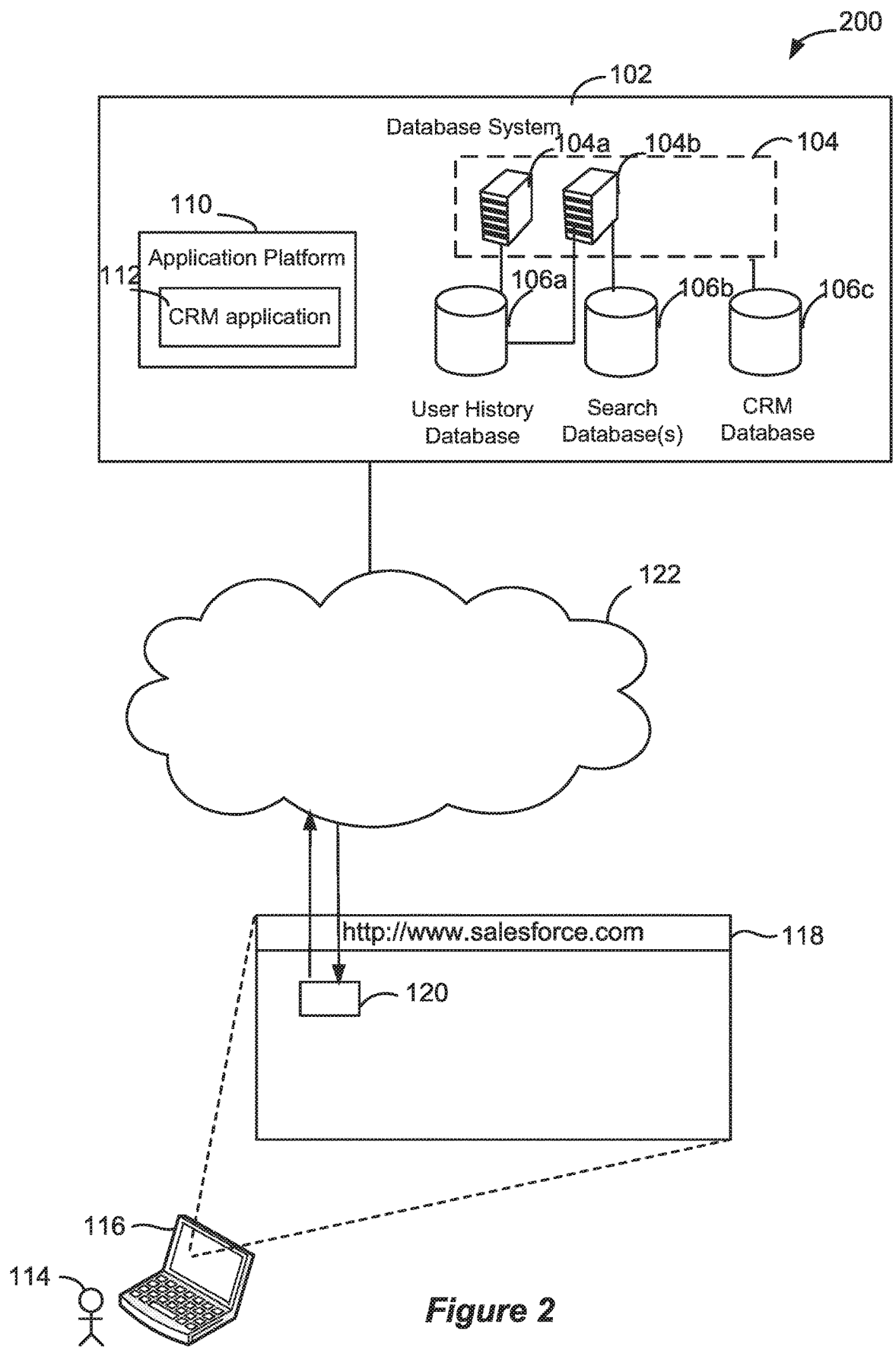
FIG. 2 shows a system diagram of an example of a system 200 in which a widget may be implemented, in accordance with some implementations.

FIG. 2 shows a system diagram of an example of a system 200 in which a widget may be implemented, in accordance with some implementations. After a web page containing an embedded widget application and during execution of the widget application, the widget application may send contextual information from client device 116 to user interaction server 104a, which may also be referred to as an API server. For example, the widget application may send the contextual information to user interaction server 104a when user 114 clicks on widget GUI 120. Contextual information can include a record identifier such as an account identifier or contact identifier. Contextual information may be obtained from a URL of the web page or data rendered within fields of the web page. In some implementations, the widget application communicates with user interaction server 104a via a CRM Application Programming Interface (API).

User interaction server 104a may save information pertaining to the contextual information in a user history database 106a. User history database 106a may store records pertaining to user interactions of a plurality of users with database system 102. For example, user history database 106a may store a URL of the web page, an identifier of a user (or user account) accessing the URL, a session identifier, and/or associated contextual information. More particularly, user interaction server 104a may generate a session identifier such as a globally unique identifier (GUID) for the browser session and return the GUID to client device 116. The GUID may be generated, for example, based, at least in part, upon a user or user account identifier and/or an identifier of client device 116.

On subsequent calls to user interaction server 104a and/or search server 104b, client device 116 may provide the GUID via an API. The GUID may then be used by user interaction server 104a and/or search server 104b to query the current context from user history database 106a. In addition, the GUID may be used by user interaction server 10a or search server 104b to query previous history for that user (or user account). Using the current context, user interaction server 104a and/or search server 104b can query CRM database 106c and/or other sources to obtain additional information pertaining to the current context. CRM database 106 may store data pertaining to a plurality of records, which may pertain to different clients or customers. For example, the additional information may include data pertaining to fields of a record identified by the record identifier.

Where a user submits a search query via search interface of widget GUI, search server 104b may process the search query based, at least in part, on contextual information pertaining to the user's current context. More particularly, search server may query search database 106b and/or other sources to obtain search results based, at least in part, on a user query, the contextual information, previous history, and/or user preferences. For example, if the user was previously accessing accounts in the Finance industry, Finance search results may be given higher prominence. Search database 106b may contain metadata such as indices to different database records, articles, etc.

Figure 3:
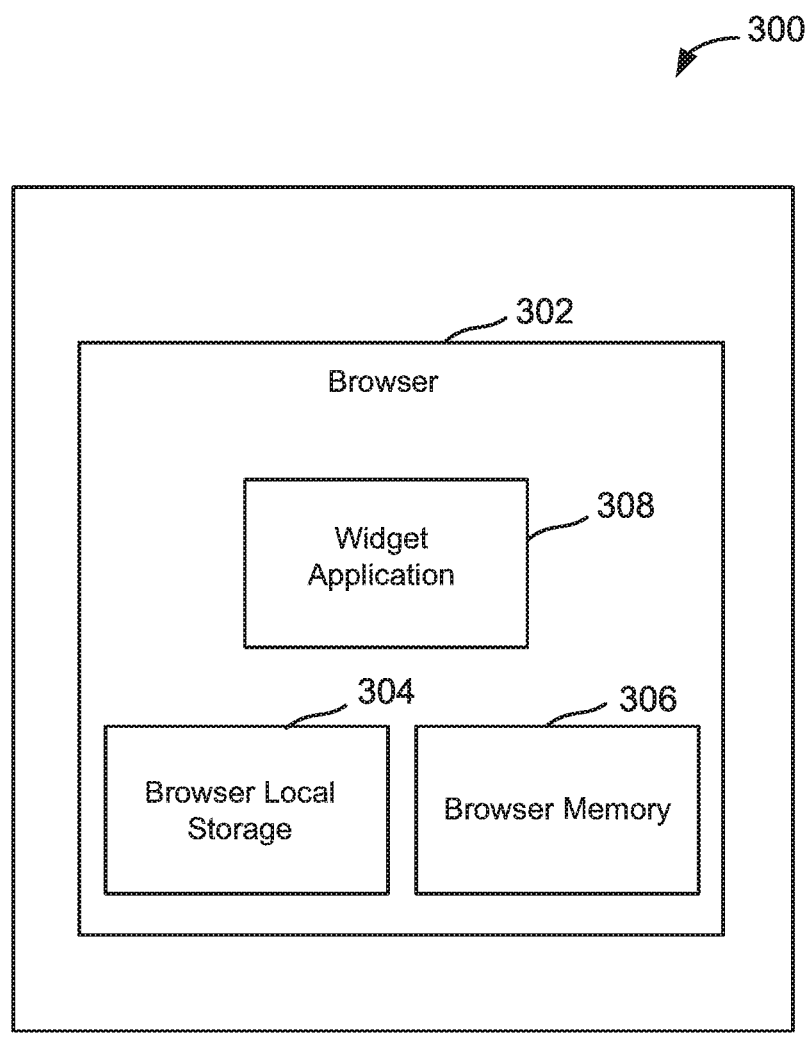
FIG. 3 shows a block diagram of an example of a client device 300 on which a widget may be implemented, in accordance with some implementations.

FIG. 3 shows a block diagram of an example of a client device 300 on which a widget may be implemented, in accordance with some implementations. Client device 300 can include a processor and memory. As shown in this example, client device 300 includes a web browser 302. Web browser 302 can include or access browser local storage 304, which is persistent storage. In addition, web browser 304 can include or access browser memory 306 (e.g., cache), which is not persistent. Web browser 302 may receive information from servers 104 during execution of widget application 308. Widget application 308 may be configured to execute in a web browser program such as web browser 302 of client device 300, which is in communication with one or more servers that provide data to the web browser 302. During execution of widget application 308, widget application may store 308 metadata and/or data to browser local storage 304 and/or browser memory 306, as will be described in further detail below.

Figure 4A:
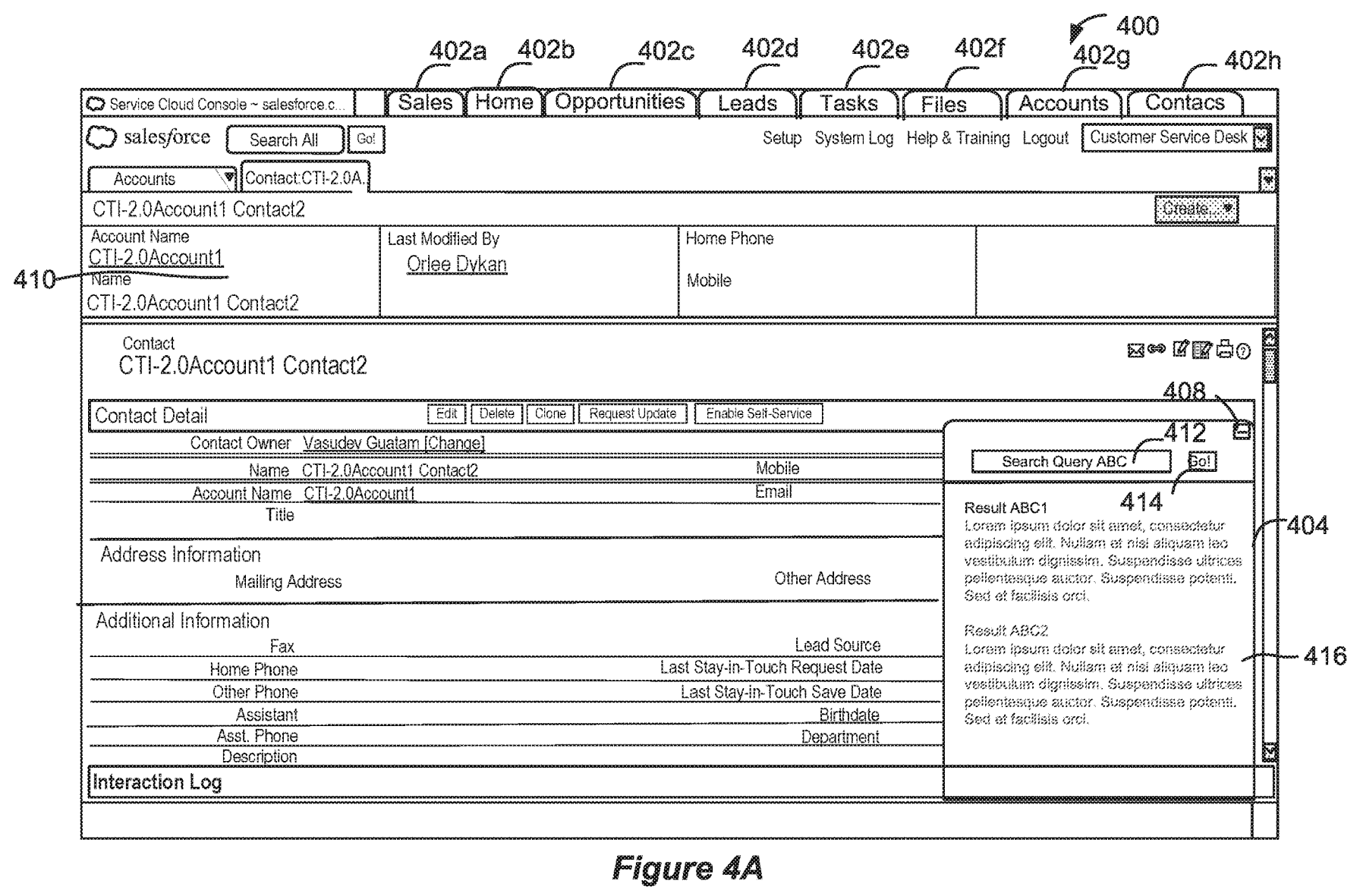

FIG. 4A shows an example of a graphical user interface (GUI) 400 generated on a display device of a client device in an on-demand database service environment, in accordance with some implementations. The user interface 400 may be adapted to display retrieved data in various segments of the user interface 400. In FIG. 4, a number of tabs 402a-402H are provided in the web browser program, allowing a user to select different panes or parts of the user interface 400. In one embodiment, as shown in FIG. 5, when an icon corresponding to a widget GUI is selected, an expanded widget GUI 404 is displayed in one portion of the user interface 400. The widget GUI 404 can be generated, updated, or rendered in response to user interaction with the user interface 400. In some implementations, widget GUI 404 can be generated, updated, or rendered in response to data delivered to the web browser program from database system 102.

In accordance with various implementations, the widget application initiates the generation, update, and/or rendering of the widget GUI 404 responsive to a user interaction with widget GUI 404. User interaction can include, but is not limited to, selecting (e.g., clicking on) widget GUI 404, submission of a search query via search interface 406, closing or opening widget GUI 404 via interaction with visual indicator 408, or a drag-and-drop operation.

A user may initiate a navigation change event to access a particular web page or database record. A navigation change event can indicate the change of the user's location, e.g., while navigating a web site. For example, the navigation change event can indicate that the user has accessed a particular web page or portion thereof, e.g., by clicking on a tab within the interface 400.

In this example, the user has selected the Accounts tab 402g, and subsequently selects a tab corresponding to Account CTI-2.0. For this account, the user selects the tab corresponding to Contact2, as shown at 410. The navigation change event indicates that the user is accessing information pertaining to Contact2 of Account CTI-2.0.

The widget application can store contextual information pertaining to the current context in memory of the client device. More particularly, the widget application may store contextual information indicating that the user is accessing information pertaining to the Contact2 of Account CTI-2.0 in memory of the client device. For example, the widget application can store the contextual information in browser memory (e.g., cache). In addition, the widget application can transmit the contextual information to servers 104 of database system 102.

Widget GUI 404 may be rendered as one contiguous area within user interface 400, or may be comprised of two or more distinct areas within user interface 400. A variety of types of information can be rendered within the widget GUI 404. The type of information that is rendered can be determined based, at a least in part, on the current context (e.g., current location of the user). For example, where the user is viewing information associated with a particular lead, JEB, a purchase history of JEB may be rendered within widget GUI 404. As another example, a phone number of a contact for JEB can be rendered within the widget GUI 404. Therefore, the widget application may obtain and render information within the widget GUI 404 that is contextual in the absence of receiving user input via the widget GUI 404.

In addition, various types of user interface objects may be rendered within the widget GUI 404 based, at least in part, on the current context (or location) of the user. A user interface object can include a button, menu, or other user interface element with which a user can interact to cause a corresponding function to be executed. As shown in this example, the widget GUI 404 can include a search interface 412 via which a user may submit a search. In this example, the user types a search query "XYZ" via search interface 412 and submits the search query by clicking on search interface element 414. The widget application transmits the search query to database system 102.

Search server(s) of database system 102 may process the search query based, at least in part, on the contextual information associated with the current context. The search server(s) of database system 102 may then provide search results to widget application. The widget application can then update widget GUI 404 such that the search results are rendered within segment 416 of widget GUI 404. Therefore, the search results rendered in widget GUI 404 may reflect the user's current context, as well as any user input submitted by the user via the widget GUI 404.

The widget application may store a state of the widget GUI in memory of the client device. More particularly, the widget application may store the state of the widget GUI in browser memory of the client device. The state of the widget GUI may be stored in association with the context of the widget GUI. The state may include, but is not limited to, a search query submitted via search interface 412 of widget GUI 404, search results rendered with widget GUI 404, a particular search result that has been selected and viewed within widget GUI 404, search suggestions provided via the widget GUI, and/or an indication of previous interactions of the user (or account owner) with the search results or search suggestions received via the widget GUI. For example, the widget application may transmit a request to server(s) of database system 102 via an API to retrieve historical information pertaining to such interactions. Historical information may include, but is not limited to, an indication that the user (e.g., account owner) has liked a particular search result (e.g., content item), disliked a particular search result, or saved a particular search result to his or her favorites. Information maintained in the state or a portion thereof may be rendered within the widget GUI.

In some implementations, the widget application stores coordinates of the widget GUI in memory of the client device. More particularly, the widget application may store the coordinates in local storage of the web browser. The coordinates can include a specific location in which an icon of the widget GUI would be rendered (e.g., where the widget GUI is in a closed state). In addition, the coordinates can include coordinates of each of the corners of the widget GUI after it has been expanded (e.g., where the widget GUI is in an open state).

In some implementations, the widget application maintains the state of the widget GUI when a user navigates between web pages of a web site and different database records. This allows a user to multitask while gathering information from multiple web pages of a web site. In addition, a user may pause a task being performed using the widget GUI to complete another task and subsequently return to the widget GUI when it's most convenient for the user. Therefore, by maintaining the state of the widget GUI across multiple web pages, the widget application enables a user to access the same information via the widget while completing various different tasks for which the information may be useful.

Figure 4B:
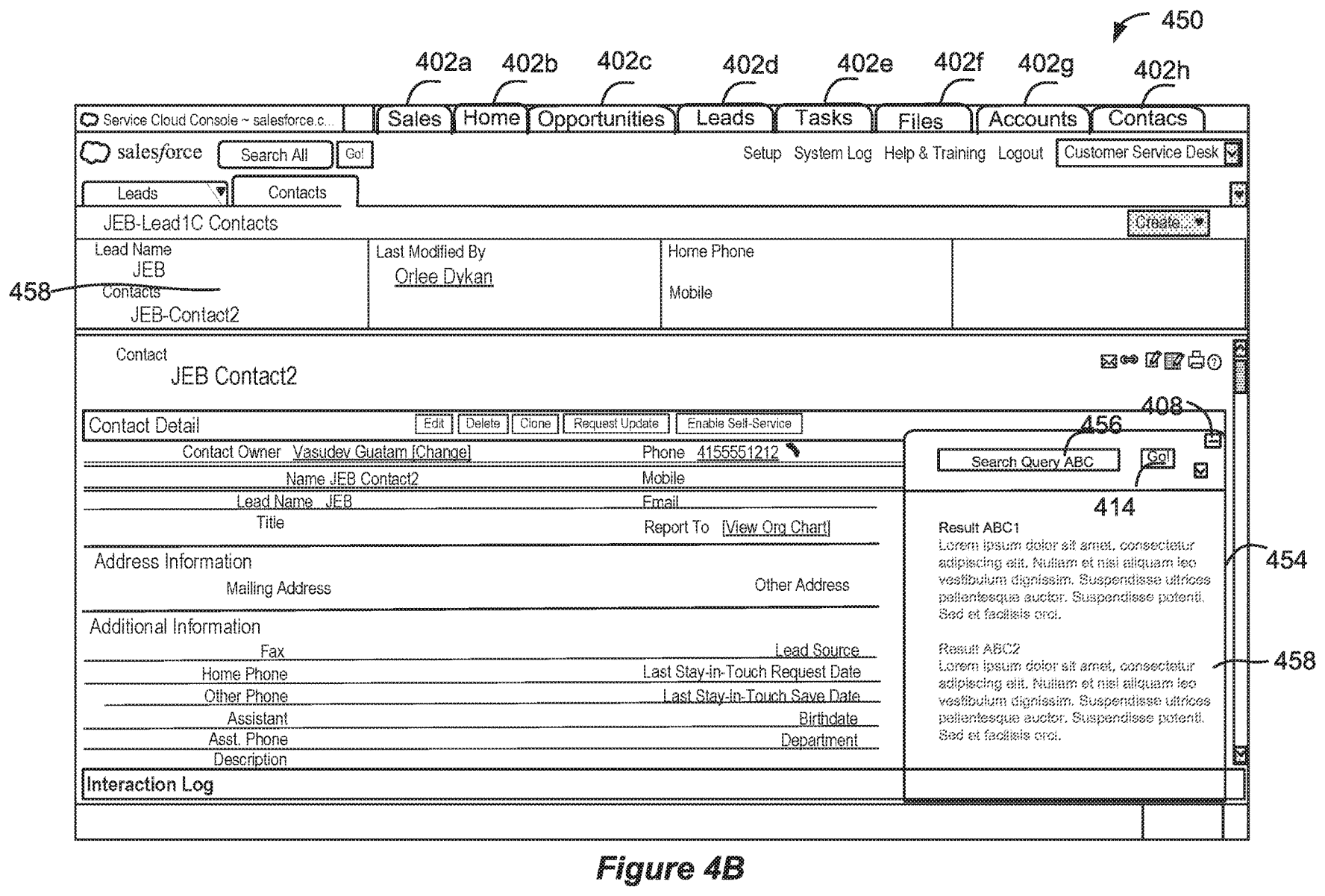

FIG. 4B shows an example of a GUI 450 generated on a display device of a client device in an on-demand database service environment, in accordance with some implementations. In this example, the user has selected the Leads tab 502e, and subsequently selects a tab corresponding to the Lead JEB. For this lead, the user selects the tab corresponding to Contact2, as shown at 458.

The widget application may reconstruct widget GUI 454 in response to a navigation change event such as navigation to a different web page within the web site. In some implementations, the widget application reconstructs the widget GUI 454 from the previously saved coordinates and state of the widget GUI 404. More particularly, as shown in this example, the widget GUI 454 may be rendered at the same location as widget GUI 404 shown in FIG. 4A. In addition, the widget GUI 454 may be rendered with the same dimensions as widget GUI 404 shown in FIG. 4A. Moreover, the previously saved state of widget GUI 404 may be used to render information identified in the previously saved state within the reconstructed widget GUI 454. As shown in FIG. 4B, the search query previously submitted via the widget GUI 404 may be rendered in search interface 456 of the widget GUI 454. In addition, the search results rendered within segment 416 of the widget GUI 404 may be rendered in segment 458 of the widget GUI 454.

Figure 5A:
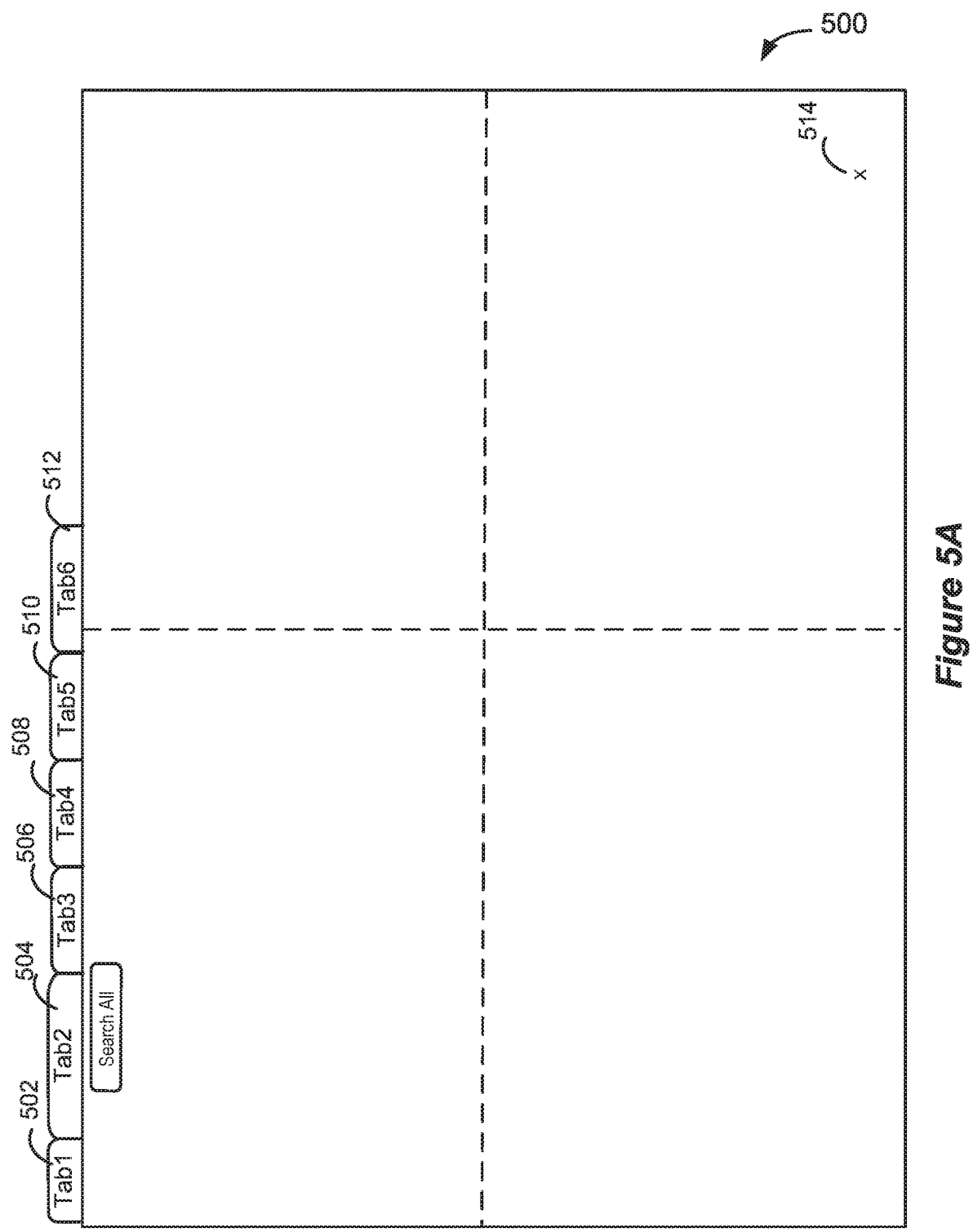
FIG. 5A shows an example of a GUI 500 including a widget GUI generated on a display device of a client device in an on-demand database service environment, in accordance with some implementations.

FIG. 5A shows an example of a GUI 500 including a widget GUI generated on a display device of a client device in an on-demand database service environment, in accordance with some implementations. The user interface 500 may be adapted to display retrieved data in various segments of the user interface 500. In FIG. 5A, a number of tabs 502-512 are provided in the web browser program, allowing a user to select different panes or parts of the user interface 500. A closed widget GUI 514 may be displayed in a corner of the user interface 500 in a default position. In this example, the closed widget GUI 514 is displayed in the lower right corner of the user interface 500.

Figure 5B:
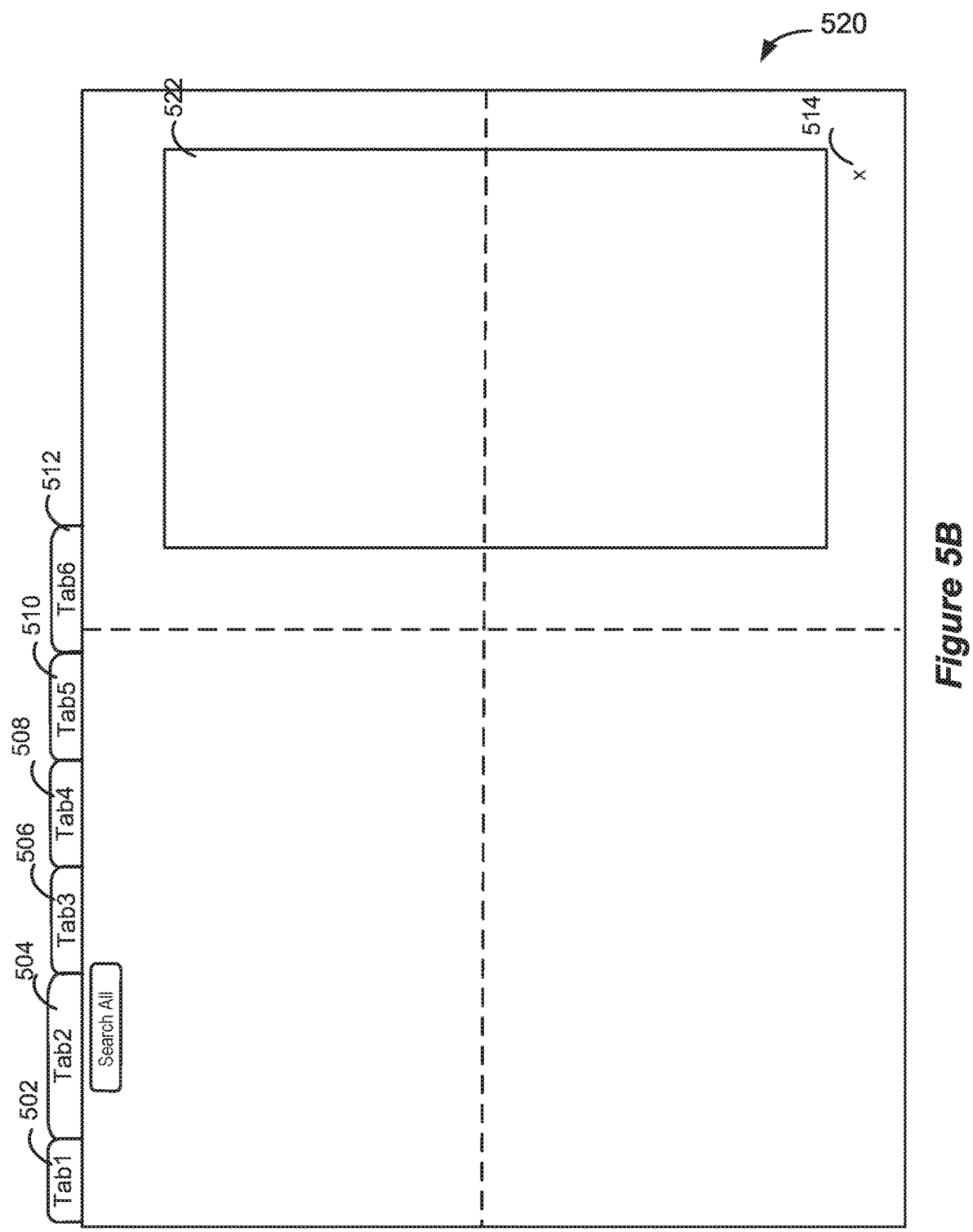
FIG. 5B shows an example of a GUI 520 generated on a display device of a client device in an on-demand database service environment after a user clicks on the closed widget GUI of FIG. 5A, in accordance with some implementations.

FIG. 5B shows an example of a GUI 520 generated on a display device of a client device in an on-demand database service environment after a user clicks on the closed widget GUI of FIG. 5A, in accordance with some implementations. A user may click on the closed widget GUI 514 to open it. After the user clicks on the closed widget GUI 514, the widget GUI may be displayed in an open state as shown at 522. Similarly, the user may click on the widget GUI while open to close or collapse the widget GUI.

When a user clicks on the closed widget element 514 to open it, the widget GUI opens to display an expanded widget GUI. In some implementations, the widget GUI is automatically expanded to fill the largest available space within the GUI 520 in proximity to the location of the closed widget element 514.

In some implementations, the orientation and/or size of the widget GUI is automatically adjusted to fill the most available space. As shown in this example, the closed widget GUI 514 is located at the lower right corner of the GUI 520 so the widget GUI is expanded upward. In this example, the closed widget GUI 514 is expanded to fill a significant portion of the right half of the GUI 520.

The widget GUI can be moved to any location within the GUI 520. In addition, the location of the widget GUI may be changed while the widget GUI is in a closed state or in an open state. More particularly, a user may click on the widget GUI to drag and drop the widget GUI to another location within the GUI 520.

In some implementations, if a widget GUI is clicked and dragged when in its closed state, the widget GUI will remain in its closed state. In some implementations, if a widget GUI is clicked and dragged while in an open state, the widget GUI will close during the dragging operation and reopen when placed in its new position. In other implementations, the widget GUI may remain open during the dragging operation.

FIG. 5C shows an example of a GUI 540 generated on a display device of a client device in an on-demand database service environment after the widget GUI of FIG. 5B is dragged to another location, in accordance with some implementations. As shown in this example, the user has dragged the widget GUI of FIG. 5B to a new location 542. After the widget GUI has been dragged to the new location 542, the widget GUI is automatically expanded to fill the most available space within the GUI 540, as shown at 544. More particularly, since the new location 542 of the widget GUI is at the upper left corner of the GUI 540, the widget GUI is expanded downward to fill a significant portion of the left half of the GUI 540.

A widget application that is embedded in a web page may be executed within a web browser. An example of operations performed by a widget application during execution of the widget application will be described in further detail below with reference to FIGS. 6-7.

Figure 6:
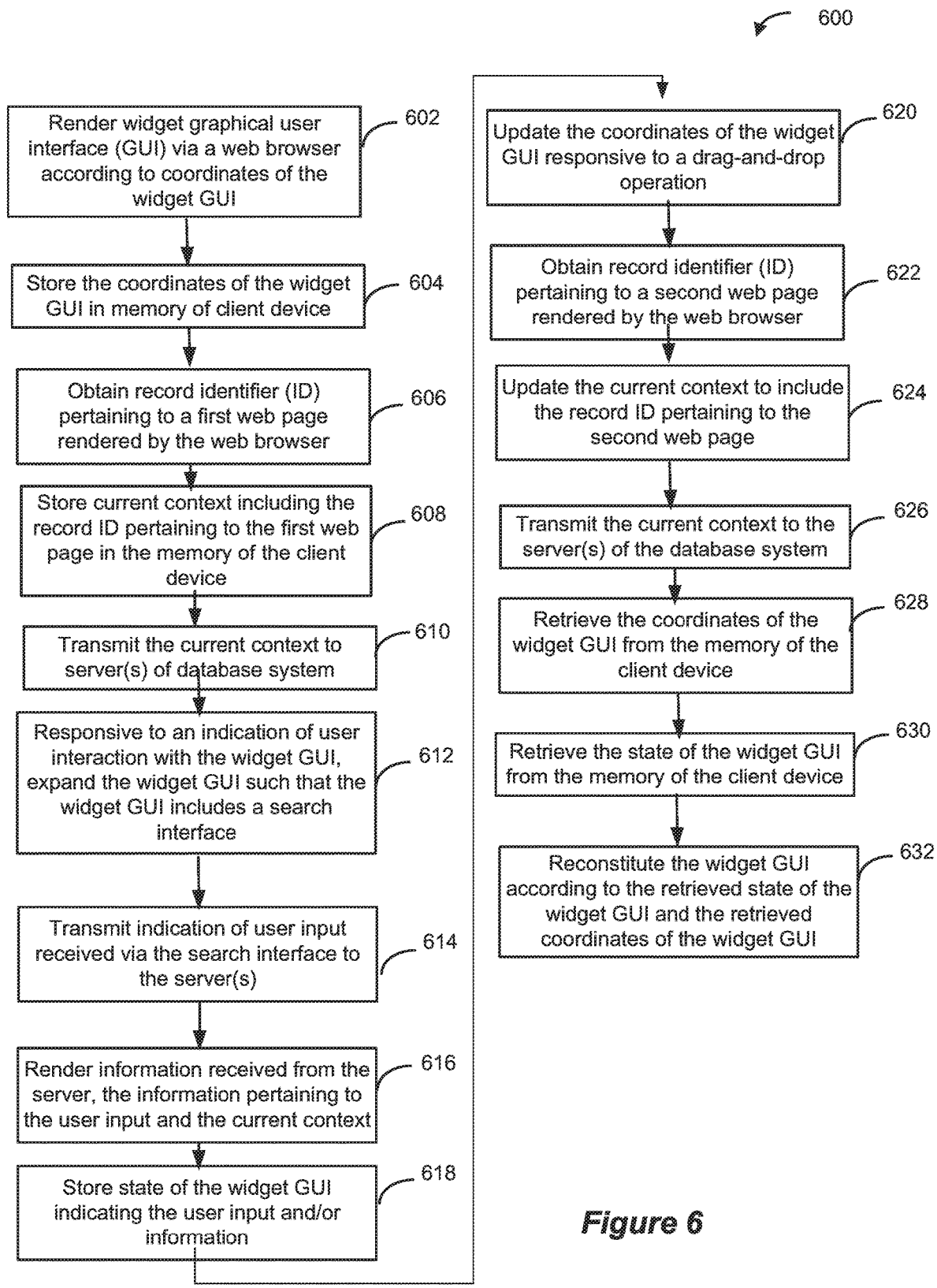
FIG. 6 shows a flow diagram of a method 600 for implementing a widget application, in accordance with some implementations.

FIG. 6 shows a flow diagram of a method 600 for implementing a widget application, in accordance with some implementations. A user may log in to a web site by entering a username and password. Once logged in, the user may navigate to various web pages of the web site. For example, the user may click on one of a plurality of user-selectable tabs provided via a web page of the web site, click on a link provided within the web page, or select another web page by selecting one of a plurality of user-selectable options provided via a user interface object such as a menu.

When the user accesses a first web page containing an embedded widget application, the first web page is loaded from a domain, which may be controlled by a data provider, e.g., salesforce.com®. The widget application may be executed in a web browser, as will be described in further detail below.

After the first web page is loaded, the widget application may execute to render a widget GUI via a web browser of a client device according to coordinates of the widget GUI at 602. For example, the widget application may be configured with default coordinates of the widget GUI.

The coordinates of the widget GUI may be stored in memory of the client device at 604. For example, the coordinates may be stored in local storage of the web browser of the client device. The coordinates may include default coordinates or new coordinates corresponding to a new location of the widget GUI that has been selected by the user. More particularly, the user may select the new location of the widget GUI by performing a drag-and-drop operation.

The coordinates of the widget GUI may correspond to a single location or region within a browser window or web page, where the location or region defines an area in which the widget GUI is rendered within a web page or browser window. More particularly, the coordinates of the widget GUI may include a first set of coordinates of the widget GUI corresponding to a closed state of the widget GUI (e.g., represented by a widget icon). For example, the coordinates may include x and y coordinates representing a single location. In addition, in some implementations, the coordinates of the widget GUI may include or indicate a second set of coordinates of the widget GUI corresponding to an open state of the widget GUI. For example, the coordinates may include x and y coordinates of four points that define corners of a region in which the widget GUI is rendered. In other implementations, boundaries of the widget GUI may be dynamically calculated based upon the coordinates (e.g., first set of coordinates) of the widget GUI, dimensions of the browser window, and/or "available" space within the browser window.

The widget application may obtain, from the first web page rendered by the web browser of the client device, a record identifier (ID) pertaining to the first web page at 606. For example, the record ID may identify a particular account, contact, lead, order, case, or opportunity.

The widget application may facilitate storing, in memory of the client device, a current context including the record ID pertaining to the first web page at 608. For example, the widget application may cause the current context to be stored in browser memory. The current context may be stored in the state of the widget GUI or may be stored in association with the state of the widget GUI.

In addition, the widget application may facilitate transmitting the current context to at least one server of a database system at 610. For example, the widget application may transmit the current context via an API of a web server such as a user interface server (e.g., API server). By providing the current context, the widget application may receive and present content within the widget GUI that is relevant to the context of the web page. More particularly, responsive to receiving the current context or a request for data of specific fields pertaining to the current context, the server of the database system may provide content pertaining to the context (and any requested fields) to the client device. In some implementations, the server transmits the content to the widget application, which may render the content or portion thereof within the widget GUI. In addition, the widget application may save the content (e.g., fields of a database record) in the state of the widget GUI. In other implementations, the server may auto-populate fields within the widget GUI with the content based upon the current context (e.g., record ID). For example, if the user opens a case via the widget GUI, the server may auto-populate fields of a case form with the data from fields of the corresponding database record.

The user may interact with the widget GUI when the widget GUI is in a closed state to cause the widget GUI to open (e.g., expand). For example, the user may click on the widget GUI to cause the widget GUI to open. Since the widget GUI may cover a portion of the web page when the widget GUI is in an open state, the user may wish to keep the widget GUI closed when not in use.

As shown in FIG. 6, responsive to receiving an indication of user interaction with the widget GUI, the widget application may facilitate expanding the widget GUI such that the widget GUI includes a search interface at 612. For example, the search interface may include a search box or other user input element of the widget GUI.

The user may then submit a search query via the widget GUI. More particularly, responsive to receiving user input (e.g., a search query) via the search interface, the widget application may facilitate transmitting, by the client device, an indication of the input to the server at 614. For example, the widget application may transmit the indication of the input to a search server.

The search server may obtain search results based, at least in part, on the current context and the input (if received). For example, the search server may obtain search results that pertain to both a user's search query and the database record being accessed. In the absence of receiving user input via the widget GUI, the search server may obtain contextually relevant information based, at least in part, on the current context (e.g., without receiving an indication of user input).

Upon receiving information from the server, the widget application may facilitate rendering, via the widget GUI, the information received from the server at 616. More particularly, the information may pertain to the current context and any input received via the search interface of the widget GUI. For example, the information may include data pertaining to a field of a database record of a database system and/or search results received responsive to a search query submitted via the search interface. The widget GUI may present data via one or more fields of the widget GUI. In this manner, the widget GUI that is presented may be contextual to the web page on which it is being rendered.

The widget application may facilitate storing, in the memory of the client device, a state of the widget GUI at 618. More particularly, the state of the widget GUI may include an indication of any input received via the search interface and/or the information received from the server. For example, the state of the widget GUI may include a search query submitted via the search interface, an indication of search results received responsive to the search query, an identifier of a particular one of the search results that has been selected via the widget GUI, data pertaining to a field of a database of the database system, and/or an indication of whether the widget GUI is in an expanded state.

The user may perform a drag-and-drop operation to change the location of the widget GUI within the browser window or web page. Responsive to a drag-and-drop operation pertaining to the widget GUI, the widget application may update the coordinates of the widget GUI at 620. More particularly, the widget application may modify the coordinates of the widget GUI that are stored in the memory of the client device and render the widget GUI according to the updated coordinates. In some implementations, the widget application modifies the coordinates of the widget GUI that are stored in the local storage of the web browser.

To illustrate the operation of the widget application to maintain the state of the widget GUI, steps performed in relation to navigation to a second web page will be described. After loading the second web page, the widget application embedded in the second web page executes as described below.

As shown in FIG. 6, the widget application may obtain a record ID pertaining to the second web page from the second web page rendered by the web browser of the client device at 622. In addition, the widget application may update, in the memory of the client device, the current context to include the record ID pertaining to the second web page at 624. As described above, the current context may be updated in the browser memory. Updating may include replacing the previously stored context or adding the record ID pertaining to the second web page to the current context.

The widget application may facilitate transmitting, by the client device, the current context pertaining to the second web page to the server at 626. As described above, the widget application may transmit the current context to a user interface (e.g., API) server via an API. In some implementations, the current context may be transmitted to the server responsive to an indication of user interaction with the widget GUI. For example, where the user clicks on a closed widget GUI to open the widget GUI, the widget application may transmit the current context to the server.

The widget GUI may be rendered based upon the stored state and coordinates of the widget GUI. More particularly, where the widget GUI is in an open state or is opened from a closed state responsive to user interaction with the widget GUI, the widget GUI is rendered such that the coordinates and state are maintained.

In some implementations, the widget application may retrieve the coordinates of the widget GUI from the memory of the client device at 628. For example, the widget application may retrieve the coordinates of the widget GUI from the local storage of the web browser. In addition, the widget application may retrieve the state of the widget GUI from the memory of the client device at 630. For example, the widget application may retrieve the state of the widget GUI from browser memory. The widget application may reconstitute (e.g., reconstruct) the widget GUI such that the widget GUI is rendered according to the retrieved state of the widget GUI and the retrieved coordinates of the widget GUI at 632. Therefore, the appearance of the widget GUI to a user may remain the same as the user navigates to different web pages.

The information rendered within the widget GUI may also be updated to include additional information received from the server (e.g., based upon the current context). In addition, where the user enters subsequent user input via the search interface of the widget GUI, the additional information may pertain to the current context and the subsequent user input. In some implementations, the state of the widget GUI represented by the widget GUI and stored in the memory of the client device may be replaced with a new state of the widget GUI that includes any subsequent user input and the additional information. Thus, the state of the widget GUI may pertain to the current context. In other implementations, the state of the widget GUI stored in the memory of the client device may include the previously stored state of the widget GUI, as well as the new state of the widget GUI.

In some implementations, the state, context, and coordinates of the widget GUI are maintained in the memory of the client device during a browser session. In some implementations, the state, context, and/or coordinates are maintained in the memory of the client device across multiple browser sessions. After the user logs off or shuts down the client device, the state, coordinates, and/or context of the widget GUI may not be maintained in the memory of the client device. In some implementations, the coordinates of the widget GUI are maintained in the memory of the client device after the user has logged off or shuts down the client device.

In the example described above, it is assumed that the user submits input via the widget GUI, which is used by the server(s) to provide information for display via the widget GUI. However, it is important to note that this example is merely illustrative. In other implementations, the server(s) may obtain and provide information that is relevant to the context of the widget GUI in the absence of user input via the widget GUI.

Figure 7:
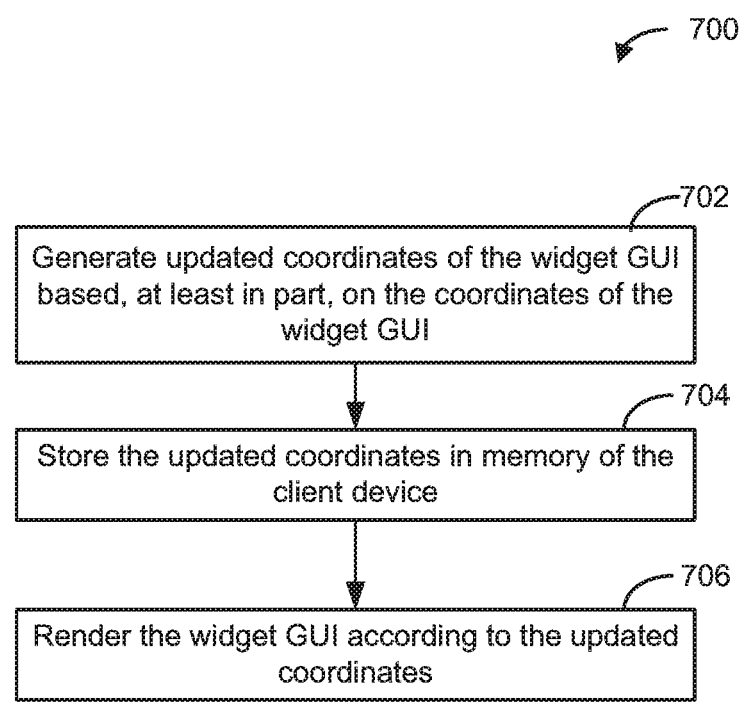
FIG. 7 shows a flow diagram of a method 700 for updating coordinates of a widget GUI, in accordance with some implementations.

In some implementations, the widget GUI is automatically rendered such that it covers the most "real estate" within a web page. FIG. 7 shows a flow diagram of a method 700 for updating coordinates of a widget GUI, in accordance with some implementations. The coordinates of the widget GUI may be updated under a number of different circumstances. For example, the coordinates of the widget GUI may be updated in response to a user selection of a location of the widget GUI, navigation to a different web page of the web site, or resizing of the browser window.

By performing a drag-and-drop operation, a user may select a new location for a widget GUI in relation to a current web page. As described above, a location of the widget GUI may be defined by coordinates, which may include or indicate one or more sets of coordinates corresponding to one or more states of the widget GUI. For example, the coordinates may include or indicate a first set of coordinates that correspond to the widget GUI when in an open state and/or a second set of coordinates that correspond to the widget GUI when in a closed state. Since the location of the widget GUI (e.g., in a closed state) is new, it is possible that the widget GUI, when open, will cover important information or a significant amount of information rendered via the web page. Similarly, where a user navigates to another web page, the widget GUI, when in an open state, may cover important information or a significant amount of information rendered via the web page.

While it is possible for a user to modify coordinates of a widget GUI by selecting a further different location within a web page, a different size for the widget GUI, and/or a different orientation for the widget GUI, this would be particularly burdensome for a user. Therefore, in some implementations, the widget application automatically modifies the coordinates of the widget GUI, as appropriate.

In some implementations, the widget application automatically generates updated coordinates of the widget GUI based, at least in part, on the coordinates of the widget GUI at 702. In addition, the updated coordinates may be generated further based, at least in part, on available "space" within a web page. For example, the widget application may identify available "space" within the web page by determining areas of the web page that do not include: 1) text, 2) one or more interface objects, 3) a significant amount of text and/or interface objects, 4) fields of data, and/or 5) a significant number of fields of data. Threshold numerical value(s) corresponding to text, interface objects, and/or fields of data may be used to determine whether to cover a particular region of the web page with the widget GUI while in an open state.

To generate the updated coordinates of the widget GUI, the widget application may ascertain a desired area in which the widget GUI may be rendered in an open state that would result in minimal disruption to the user experience. For example, the widget application may select widget GUI characteristics such as a size, shape, and/or orientation of the widget GUI that are optimal when the widget GUI is in an open state. For example, the orientation of the widget GUI may be horizontal or vertical. The widget GUI may select a desired area (e.g., size, shape, and/or orientation) that is proximate to the previously stored, configured, or selected location (e.g., coordinates) of the widget GUI when in a closed state. The updated coordinates may be ascertained or calculated based, at least in part, on the selected widget GUI characteristics.

In some implementations, the widget GUI may select a quadrant of the web page in which the widget GUI is to be expanded when in an open state. For example, the widget application may select one or more quadrants that are closest to the previously stored, configured, or selected location (and corresponding coordinates) of the widget GUI when in a closed state.

In some instances, the widget application may update the coordinates of the widget GUI such that the location of the widget GUI is different from a recent previous location of the widget GUI. In other words, the widget application may update the coordinates of the widget GUI such that a first set of coordinates of the widget GUI corresponding to a closed state are modified. In addition, in some instances, the widget application may update the coordinates of the widget GUI such that a second set of coordinates of the widget GUI corresponding to an open state are modified.

The widget application may store the updated coordinates of the widget GUI in memory of the client at 704 such that the updated coordinates of the widget GUI replace the coordinates of the widget GUI previously stored in the memory of the client device. As described above, the coordinates and updated coordinates may be stored in local storage of the web browser. Therefore, the widget application may store the updated coordinates of the widget GUI in the local storage of the web browser such that the updated coordinates of the widget GUI replace the coordinates of the widget GUI previously stored in the local storage of the web browser.

In addition, the widget application may render the widget GUI according to the updated coordinates at 706. More particularly, the widget application may render the widget GUI, when in an open state, according to the updated coordinates. In some instances, the updated coordinates may result in rendering the widget application in a different location when in a closed state.

In some implementations, the widget GUI, when in an open state, is expanded to fill a quadrant of the GUI that is closest to a location (and coordinates) of the closed widget GUI. For example, where the location of the closed widget GUI is in a lower right corner of the web page, the widget GUI may be expended to fill the lower right quadrant of the GUI when the widget GUI is in an open state.

Some implementations may incorporate various technologies for constructing pages. For example, one or more components or pages may be constructed using Lumen, Ext, ExtJS, Flex, and/or VisualForce™ technologies available from Salesforce.com®. As another example, one or more components or pages may be constructed using Flash, Ajax, HTML, JavaScript®, or other publicly available technologies.

In some implementations, one or more technologies developed by Salesforce.com®, such as the Web Services API, VisualForce™, and/or Apex Service-oriented Architecture ("SOA") may be used to display and/or integrate disparate data sources from across multiple systems. The apparatus and methods described herein may be designed or configured for use with various web browsers, such as IE 7+, Firefox 3.5+, Safari, etc.

In some implementations, performance may be improved by optimizing pages for high performance in a browser environment. Some web analytics and/or online business optimization platforms such as Omniture® may be used to measure the performance and adjust it as needed. In some embodiments, a network operations center ("NOC") may be used to monitor performance and react quickly to performance degradation.

Ext is a JavaScript® platform developed by Salesforce.com® that includes a broad variety of UI components that can be used to develop highly interactive browser UIs. Ext may allow a complex layout. It also has a well-defined event model which facilitates component communication. JavaScript components may be created by subclassing Ext's components.

In some implementations, some or all of the content viewable through the service cloud console will be inside of HTML iframes. The content included inside HTML iframes may include, but is not limited to: detail/edit pages, enhanced list views, customer and Salesforce®-created VisualForce™ pages and any random sites that customers put into custom links. HTML iframes may be useful because they may facilitate putting content of multiple detail/edit pages on the same browser page. Without iframes, for example, there may be conflicting ids and/or broken JavaScript®.

In some implementations, the client machine may communicate with a server via Ajax. The workspace context panel may display a layout-driven grid of fields from the detail page to the user. The HTML for these fields may differ from that in the Detail page because, for example, some complex elements (e.g., lookup) may have specific HTML IDs and output JavaScript® that references those HTML IDs. In order to reconstruct those elements and reassign HTML IDs to redisplay them, the workspace context panel may request the HTML for its fields from a servlet that resolves the HTML ID and JavaScript® issues.

It should be noted that some of the implementations described herein may be equipped with one or more of the features set forth in the following published applications: US2003/0233404, US2004/0210909, US2005/023022, US2005/0283478, US2006/0206834, and/or US2005/

0065925, all of which are hereby incorporated by reference in their entirety and for all purposes.

While the present embodiments are described with reference to an on-demand service environment capable of supporting multiple tenants, these embodiments are not limited to multi-tenant databases or deployment on application servers. Embodiments may be practiced using other database architectures, for instance, ORACLE®, DB2® by IBM, and the like without departing from the scope of the embodiments claimed.

Techniques described or referenced herein can be implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
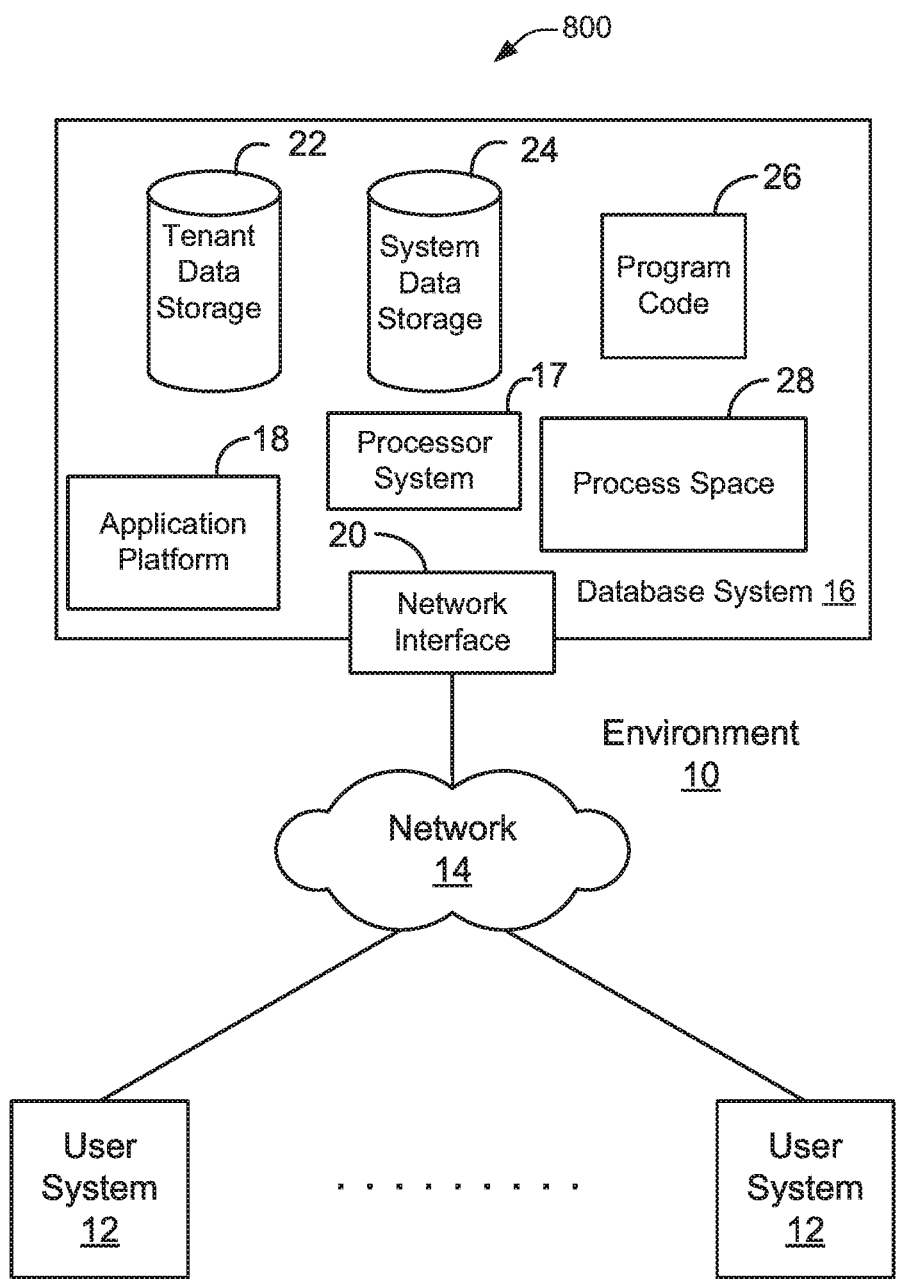
FIG. 8A shows a block diagram of an example of an environment 800 in which an on-demand database service can be used, in accordance with some implementations.

FIG. 8A shows a block diagram of an example of an environment 800 in which an on-demand database service can be used, in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s).

Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 8B:
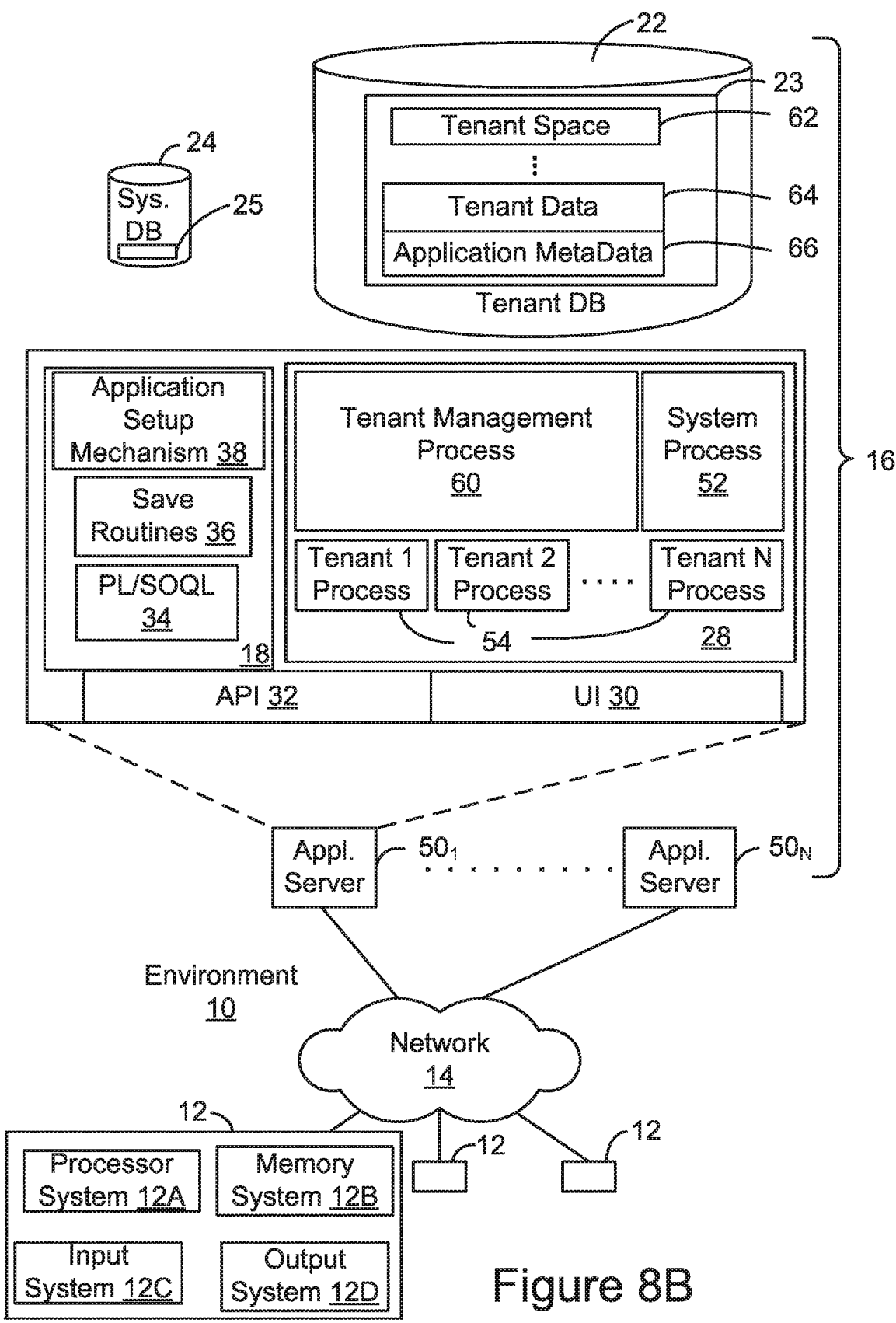
FIG. 8B shows a block diagram of an example of some implementations of elements of FIG. 8A and various possible interconnections between these elements, in accordance with some implementations.

One arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 8B shows a block diagram of an example of some implementations of elements of FIG. 8A and various possible interconnections between these elements. That is, FIG. 8B also illustrates environment 10. However, in FIG. 5B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
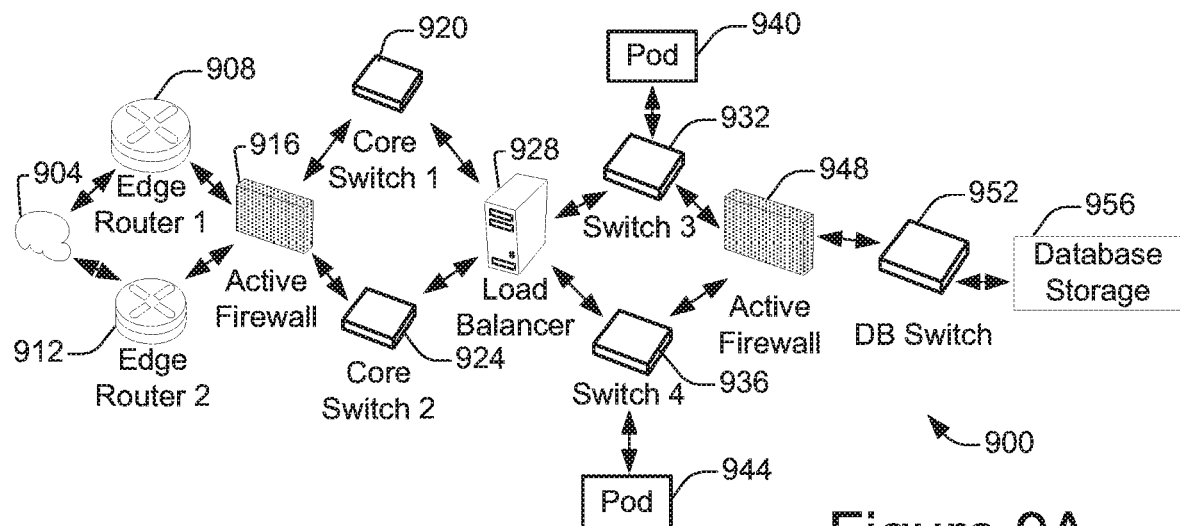
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 9B:
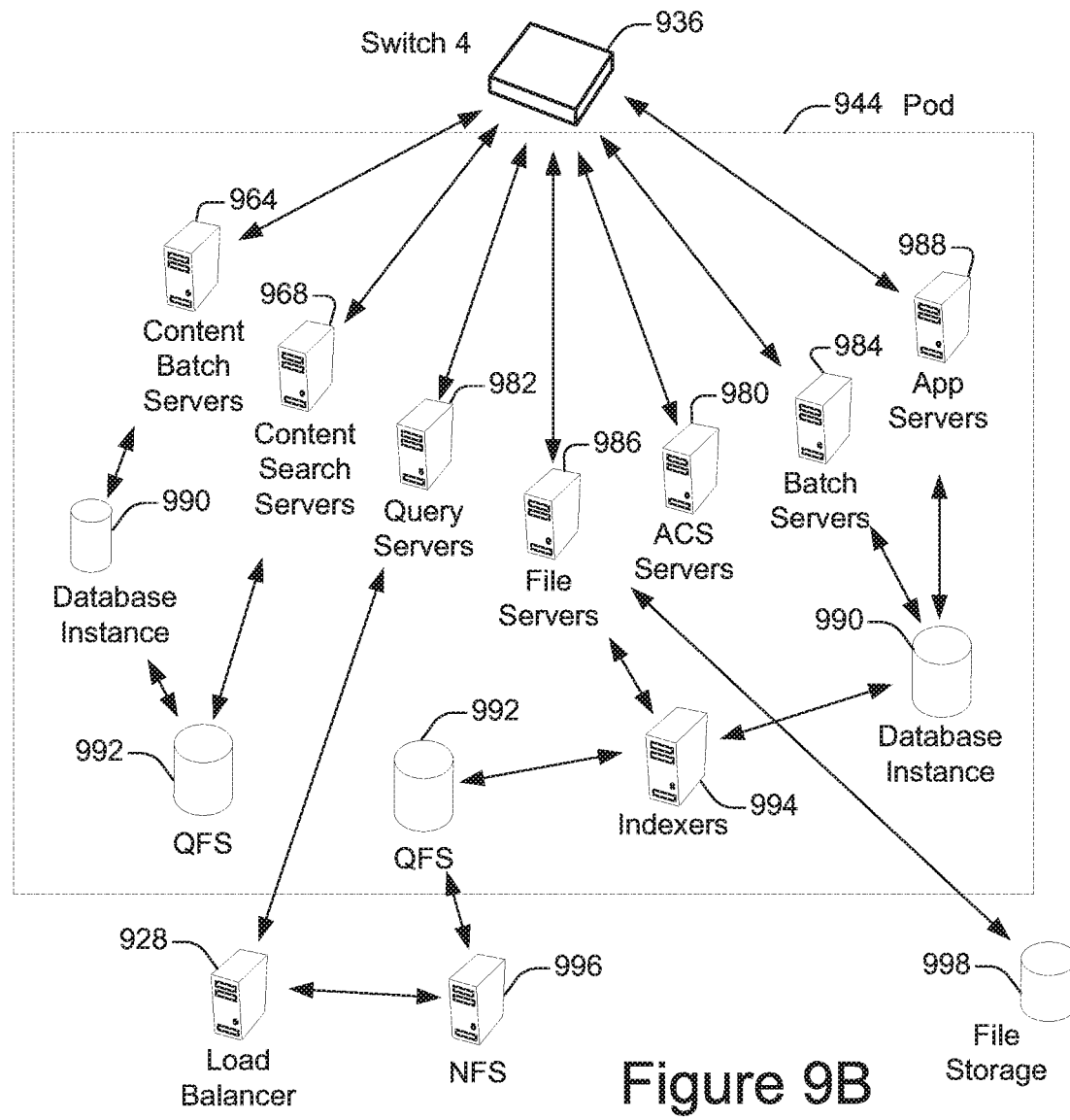
FIG. 9B shows a system diagram further illustrating an example of architectural components of an on-demand database service environment, in accordance with some implementations.

As shown in FIGS. 9A and 9B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 9A and 9B, some implementations of an on-demand database service environment may include anywhere from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 6B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 8A and 8B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 8A, 8B, 9A and 9B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 5A and 5B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 8A, 8B, 9A and 9B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer program product comprising one or more non-transitory computer-readable media having computer-readable instructions stored therein, the computer-readable instructions capable of being executed by one or more processors, the computer-readable instructions configurable to cause:

rendering a widget graphical user interface (GUI) via a web browser of a client device;

storing coordinates of the widget GUI in local storage of the web browser of the client device;

responsive to receiving an indication of user interaction with the widget GUI, facilitating expanding the widget GUI such that the widget GUI includes a user interface element;

facilitating rendering, via the widget GUI, information received from at least one server of a database system, the information pertaining to a first web page rendered by the web browser;

facilitating storing, in memory of the client device, a state of the widget GUI, the state of the widget GUI including an indication of at least one of input received via the user interface element or the information received from the server;

retrieving the coordinates of the widget GUI from the local storage of the web browser;
retrieving the state of the widget GUI from the memory of the client device;
reconstituting the widget GUI such that the widget GUI is rendered, in relation to a second web page rendered by the web browser of the client device, according to the retrieved state of the widget GUI and the retrieved coordinates of the widget GUI; and
maintaining the coordinates of the widget GUI in the local storage of the web browser across two or more browser sessions.

2. The computer program product as recited in claim 1, the computer-readable instructions further configurable to cause:
responsive to a drag-and-drop operation pertaining to the widget GUI, updating the coordinates of the widget GUI in the local storage of the web browser to include updated coordinates and rendering the widget GUI according to the updated coordinates.

3. The computer program product as recited in claim 1, the information pertaining to a record identifier (ID) relating to the first web page, the record identifier identifying a database record.

4. The computer program product as recited in claim 1, the computer-readable instructions further configurable to cause:
obtaining from the first web page rendered by the web browser of the client device, a record identifier (ID) relating to the first web page; and
facilitating transmitting the record ID to the server of the database system;
wherein the information pertains to the record ID.

5. The computer program product as recited in claim 4, the computer-readable instructions further configurable to cause:
storing, in the memory of the client device, the record ID relating to the first web page.

6. The computer program product as recited in claim 1, the user interface element including a search interface, the state of the widget GUI comprising at least one of: a search query submitted via the search interface, an indication of search results received responsive to the search query, an identifier of a particular one of the search results that has been selected via the widget GUI, data pertaining to a field of a database of the database system, or an indication of whether the widget GUI is in an expanded state.

7. The computer program product as recited in claim 1, the computer-readable instructions further configurable to cause:
responsive to receiving input via the user interface element, facilitating transmitting, by the client device, an indication of the input to the server;
the information further pertaining to the input received via the user interface element of the widget GUI.

8. The computer program product as recited in claim 1, the computer-readable instructions further configurable to cause:
obtaining contextual information relating to the first web page; and
facilitating transmitting the contextual information to the server of the database system;
wherein the information pertains to the contextual information.

9. A system comprising:
a database system implemented using a server system including a processor, the database system configurable to cause:
providing a first web page having an embedded widget application to a web browser of a client device, the widget application being configured to cause:
rendering a widget graphical user interface (GUI) via a web browser of a client device;
storing coordinates of the widget GUI in local storage of the web browser of the client device;
responsive to receiving an indication of user interaction with the widget GUI, facilitating expanding the widget GUI such that the widget GUI includes a user interface element;
facilitating rendering, via the widget GUI, information received from at least one server of the database system, the information pertaining to the first web page;
facilitating storing, in memory of the client device, a state of the widget GUI, the state of the widget GUI including an indication of at least one of input received via the user interface element or the information received from the server;
retrieving the coordinates of the widget GUI from the local storage of the web browser;
retrieving the state of the widget GUI from the memory of the client device;
reconstituting the widget GUI such that the widget GUI is rendered, in relation to a second web page rendered by the web browser of the client device, according to the retrieved state of the widget GUI and the retrieved coordinates of the widget GUI; and
maintaining the coordinates of the widget GUI in the local storage of the web browser across two or more browser sessions.

10. The system as recited in claim 9, the widget application being further configured to cause: responsive to a drag-and-drop operation pertaining to the widget GUI, updating the coordinates of the widget GUI in the local storage of the web browser to include updated coordinates and rendering the widget GUI according to the updated coordinates.

11. The system as recited in claim 9, the information pertaining to a record identifier (ID) relating to the first web page, the record identifier identifying a database record.

12. The system as recited in claim 9, the widget application being further configured to cause:
obtaining from the first web page rendered by the web browser of the client device, a record identifier (ID) relating to the first web page; and
facilitating transmitting the record ID to the server of the database system;
wherein the information pertains to the record ID.

13. The system as recited in claim 12, the widget application being further configured to cause:
storing, in the memory of the client device, the record ID relating to the first web page.

14. The system as recited in claim 9, the user interface element including a search interface, the state of the widget GUI comprising at least one of: a search query submitted via the search interface, an indication of search results received responsive to the search query, an identifier of a particular one of the search results that has been selected via the widget GUI, data pertaining to a field of a database of the database system, or an indication of whether the widget GUI is in an expanded state.

15. The system as recited in claim 9, the widget application being further configured to cause:
responsive to receiving input via the user interface element, facilitating transmitting, by the client device, an indication of the input to the server;
the information further pertaining to the input received via the user interface element of the widget GUI.

16. A method, comprising:
providing a first web page having an embedded widget application to a web browser of a client device, the widget application being configured to cause:
rendering a widget graphical user interface (GUI) via a web browser of a client device;
storing coordinates of the widget GUI in local storage of the web browser of the client device;
responsive to receiving an indication of user interaction with the widget GUI, facilitating expanding the widget GUI such that the widget GUI includes a user interface element;
facilitating rendering, via the widget GUI, information received from at least one server of a database system, the information pertaining to the first web page;
facilitating storing, in memory of the client device, a state of the widget GUI, the state of the widget GUI including an indication of at least one of input received via the user interface element or the information received from the server;
retrieving the coordinates of the widget GUI from the local storage of the web browser;
retrieving the state of the widget GUI from the memory of the client device;
reconstituting the widget GUI such that the widget GUI is rendered, in relation to a second web page rendered by the web browser of the client device, according to the retrieved state of the widget GUI and the retrieved coordinates of the widget GUI; and
maintaining the coordinates of the widget GUI in the local storage of the web browser across two or more browser sessions.

17. The method as recited in claim 16, further comprising:
responsive to a drag-and-drop operation pertaining to the widget GUI, updating the coordinates of the widget GUI in the local storage of the web browser to include updated coordinates and rendering the widget GUI according to the updated coordinates.

18. The method as recited in claim 16, the information pertaining to a record identifier (ID) relating to the first web page, the record identifier identifying a database record.

19. The method as recited in claim 16, further comprising:
obtaining from the first web page rendered by the web browser of the client device, a record identifier (ID) relating to the first web page; and
facilitating transmitting the record ID to the server of the database system;
wherein the information pertains to the record ID.

20. The method as recited in claim 19, the widget application being further configured to cause:
storing, in the memory of the client device, the record ID relating to the first web page.

21. The method as recited in claim 16, the user interface element including a search interface, the state of the widget GUI comprising at least one of: a search query submitted via the search interface, an indication of search results received responsive to the search query, an identifier of a particular one of the search results that has been selected via the widget GUI, data pertaining to a field of a database of the database system, or an indication of whether the widget GUI is in an expanded state.

* * * * *